United States Patent
Kaes et al.

(10) Patent No.: US 9,126,457 B2
(45) Date of Patent: Sep. 8, 2015

(54) PNEUMATIC TIRE HAVING FIRST TREAD CAP ZONE AND SECOND TREAD CAP ZONE

(75) Inventors: Christian Jean-Marie Kaes, Schrondweiler (LU); Carlo Kanz, Mamer (LU); Olivio Jean-Baptiste Pagliarini, Consdorf (LU); Marc Weydert, Strassen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 966 days.

(21) Appl. No.: 13/297,613

(22) Filed: Nov. 16, 2011

(65) Prior Publication Data

US 2012/0138203 A1 Jun. 7, 2012

Related U.S. Application Data

(60) Provisional application No. 61/419,926, filed on Dec. 6, 2010.

(51) Int. Cl.
*B60C 11/00* (2006.01)
*B60C 1/00* (2006.01)
*C08L 9/06* (2006.01)

(52) U.S. Cl.
CPC ............ *B60C 11/005* (2013.01); *B60C 1/0016* (2013.04); *B60C 11/0058* (2013.04); *C08L 9/06* (2013.01); *B60C 2011/0025* (2013.04); *Y10T 152/10495* (2015.01)

(58) Field of Classification Search
CPC ................................ B60C 11/005; B60C 11/0058
See application file for complete search history.

(56) References Cited

U.S. PATENT DOCUMENTS

| 7,131,474 | B2 | 11/2006 | Sandstrom |
| 7,559,348 | B2 | 7/2009 | Puhala et al. |
| 7,615,591 | B2 * | 11/2009 | Matsui ........................ 524/493 |
| 7,789,117 | B2 | 9/2010 | Puhala et al. |
| 2002/0045697 | A1 * | 4/2002 | Sohnen et al. ............... 524/492 |
| 2004/0118495 | A1 * | 6/2004 | Sandstrom et al. ........ 152/209.5 |
| 2004/0261927 | A1 | 12/2004 | Weydert et al. |

(Continued)

FOREIGN PATENT DOCUMENTS

| CN | 1663993 A | 9/2005 |
| CN | 1769331 A | 5/2006 |
| CN | 101007491 A | 8/2007 |

(Continued)

OTHER PUBLICATIONS

Machine translation for Japan 08-176348 (no date).*

(Continued)

*Primary Examiner* — Steven D Maki
(74) *Attorney, Agent, or Firm* — John D. DeLong

(57) ABSTRACT

The invention is directed to a pneumatic tire having a rubber tread of a cap/base construction comprising an outer rubber tread cap layer containing an outer running surface and an underlying rubber tread base layer; wherein said tread cap layer comprises at least two circumferential, longitudinal rubber tread cap zones; wherein said tread cap zones individually extend from said tread cap running surface radially inward to said tread base layer; wherein said at least two tread cap zones comprises a first tread cap zone and a second tread cap zone adjacent to the first tread cap zone; the first tread cap zone and the second tread cap zone each independently comprising a vulcanizable rubber composition.

3 Claims, 1 Drawing Sheet

(56) References Cited

U.S. PATENT DOCUMENTS

| | | |
|---|---|---|
| 2006/0094815 A1 | 5/2006 | Kunisawa et al. |
| 2011/0048599 A1* | 3/2011 | Ryba et al. ............... 152/209.5 |

FOREIGN PATENT DOCUMENTS

| | | | |
|---|---|---|---|
| CN | 101189273 A | 5/2008 | |
| EP | 341187 A2 * | 11/1989 | |
| EP | 864446 A1 * | 9/1998 | |
| EP | 0869016 | 10/1998 | ............... B60C 11/00 |
| EP | 1398182 | 3/2004 | ............... B60C 11/00 |
| EP | 1398182 A2 | 3/2004 | |
| EP | 1493596 | 1/2005 | ............... B60C 1/00 |
| EP | 1493597 | 1/2005 | ............... B60C 1/00 |
| EP | 1561605 | 8/2005 | ............... B60C 11/00 |
| EP | 1818188 | 8/2007 | ............... B60C 11/00 |
| EP | 1911797 | 4/2008 | ............... C08K 3/04 |
| EP | 2147806 | 1/2010 | ............... B60C 11/00 |
| EP | 2147806 A1 | 1/2010 | |
| EP | 2289712 | 3/2011 | ............... B60C 1/00 |
| JP | 08-176348 A * | 7/1996 | |

OTHER PUBLICATIONS

European Search Report completed Apr. 17, 2012.
Chinese Search Report.
Chinese Search Report-Supplemental.

* cited by examiner

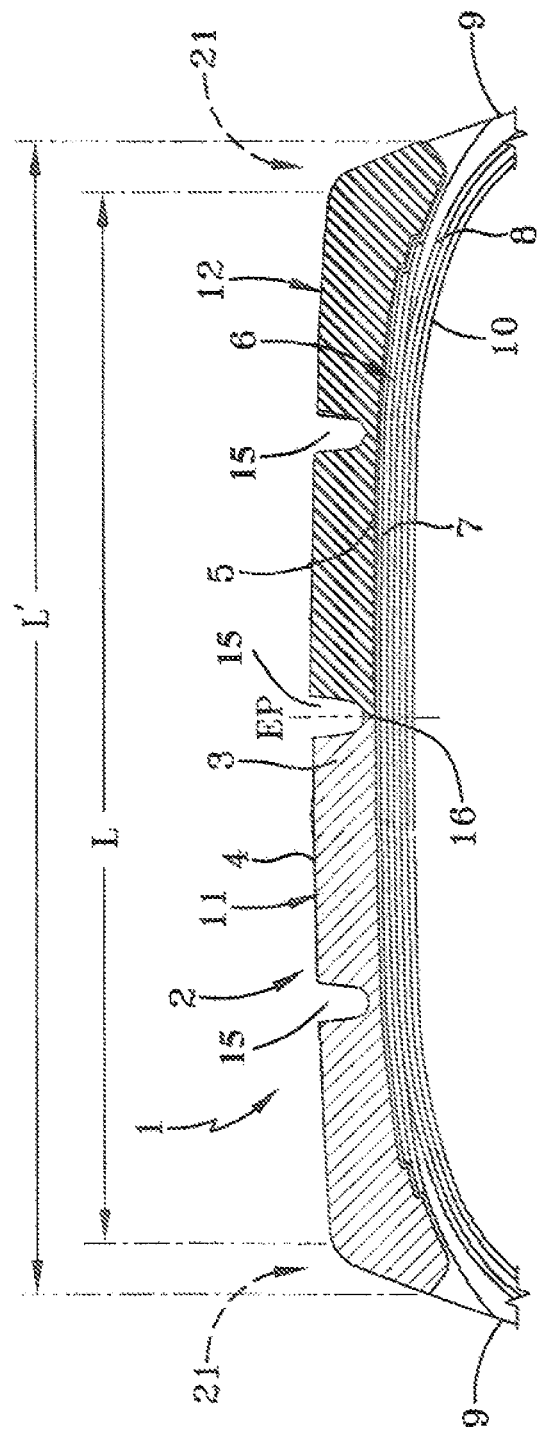

PNEUMATIC TIRE HAVING FIRST TREAD CAP ZONE AND SECOND TREAD CAP ZONE

The Applicants hereby claim the benefit of prior U.S. Provisional Application Ser. No. 61/419,926, filed on Dec. 6, 2010.

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads.

SUMMARY OF THE INVENTION

The invention is directed to a pneumatic tire having a rubber tread of a cap/base construction comprising an outer rubber tread cap layer containing an outer running surface and an underlying rubber tread base layer; wherein said tread cap layer comprises at least two circumferential, longitudinal rubber tread cap zones; wherein said tread cap zones individually extend from said tread cap running surface radially inward to said tread base layer; wherein said at least two tread cap zones comprises a first tread cap zone and a second tread cap zone adjacent to the first tread cap zone; the first tread cap zone and the second tread cap zone each independently comprising a vulcanizable rubber composition comprising:

30 to 70 parts by weight, per 100 parts by weight of elastomer (phr) of a first styrene-butadiene rubber; wherein the first styrene-butadiene rubber is i) a solution-polymerized styrene-butadiene rubber with a bound styrene content of from 30 to 50 percent by weight, a vinyl 1,2 content of from 10 to 40 percent by weight based on the rubber weight, and a Tg of from about −40° C. to about −20° C.;

30 to 70 phr of a second styrene-butadiene rubber wherein the second styrene-butadiene rubber is a solution-polymerized styrene-butadiene rubber with a bound styrene content of from 25 to 45 percent by weight, a vinyl 1,2 content of from 20 to 60 percent by weight based on the rubber weight, and a Tg of from about −30° C. to about −5° C.;

40 to 60 phr of a low PCA process oil having a polycyclic aromatic content of less than 3 percent by weight as determined by the IP346 method, and 15 to 35 phr of a resin, wherein the total amount of oil and resin ranges from 55 to 75 phr; and carbon black and silica in a combined amount of from 115 to 135 phr;

wherein at least one of the first and second styrene-butadiene rubbers has a weight average molecular weight greater than 1,000,000;

wherein the first styrene-butadiene rubber and the second styrene-butadiene rubber have a difference in Tg ranging from 10 to 20° C.;

wherein the weight ratio of silica to carbon black in the rubber composition of the first tread cap zone is in a range of from 4:1 to 6:1 and the weight ratio of silica to carbon black in the rubber composition of the second tread cap zone is in a range of from 0.7:1 to 1.3:1.

BRIEF DESCRIPTION OF THE DRAWINGS

The drawing depicts a partial cross-sectional view of a cap/base configured tread portion of a pneumatic tire.

DESCRIPTION OF THE INVENTION

The invention is directed to a pneumatic tire having a rubber tread of a cap/base construction comprising an outer rubber tread cap layer containing an outer running surface and an underlying rubber tread base layer; wherein said tread cap layer comprises at least two circumferential, longitudinal rubber tread cap zones; wherein said tread cap zones individually extend from said tread cap running surface radially inward to said tread base layer; wherein said at least two tread cap zones comprises a first tread cap zone and a second tread cap zone adjacent to the first tread cap zone; the first tread cap zone and the second tread cap zone each independently comprising a vulcanizable rubber composition comprising:

30 to 70 parts by weight, per 100 parts by weight of elastomer (phr) of a first styrene-butadiene rubber; wherein the first styrene-butadiene rubber is i) a solution-polymerized styrene-butadiene rubber with a bound styrene content of from 30 to 50 percent by weight, a vinyl 1,2 content of from 10 to 40 percent by weight based on the rubber weight, and a Tg of from about −40° C. to about −20° C.;

30 to 70 phr of a second styrene-butadiene rubber wherein the second styrene-butadiene rubber is a solution-polymerized styrene-butadiene rubber with a bound styrene content of from 25 to 45 percent by weight, a vinyl 1,2 content of from 20 to 60 percent by weight based on the rubber weight, and a Tg of from about −30° C. to about −5° C.;

40 to 60 phr of a low PCA process oil having a polycyclic aromatic content of less than 3 percent by weight as determined by the IP346 method, and 15 to 35 phr of a resin, wherein the total amount of oil and resin ranges from 55 to 75 phr; and carbon black and silica in a combined amount of from 115 to 135 phr;

wherein at least one of the first and second styrene-butadiene rubbers has a weight average molecular weight greater than 1,000,000;

wherein the first styrene-butadiene rubber and the second styrene-butadiene rubber have a difference in Tg ranging from 10 to 20° C.;

wherein the weight ratio of silica to carbon black in the rubber composition of the first tread cap zone is in a range of from 4:1 to 6:1 and the weight ratio of silica to carbon black in the rubber composition of the second tread cap zone is in a range of from 0.7:1 to 1.3:1.

The sole drawing is provided as depicting a partial cross-sectional view of a tire having a tread of a cap/base construction where the outer tread cap layer is presented with first and second tread cap zones.

In particular, the drawing represents a partial cross-section of a tire (1) centered on equatorial plane EP and having a tread (2) comprised of a tread cap layer (3) having a running surface (4) intended to be ground-contacting and underlying tread base layer (5) as a transition zone between said tread cap layer (3) and tire carcass (6) which may include a rubber encapsulated belt layer (7); two spaced apart relatively inextensible beads (not shown) to accommodate mounting the tire on a rigid rim (not shown), carcass plies as rubber encapsulated fabric reinforced plies (8) extending between said beads through a crown region of the tire (1), a pair of partially shown sidewalls (9) individually extending between said beads and outer, peripheral edges of said tread (2) and a rubber innerliner layer (10).

Tread cap layer (3) is comprised of two circumferential (side-by-side, or adjacent) longitudinal zones of rubber compositions. Tread cap zones (11,12) extend from the outer running surface (4) of the tread cap layer (3) radially inward to the underlying rubber tread base layer (5) which does not contain the aforesaid zones of the tread cap zones.

Zones of tread cap layer (3) are comprised of first tread zone (11) and second tread cap zone (12) positioned adjacent to and axially displaced from first tread cap zone (11).

Divisional junction (16) is provided between first tread cap zone (11) and second tread cap zone (12) and is located within circumferential groove (15).

In the embodiment shown in the drawing, first tread cap zone (11) spans, for example, about 50 percent of span (L) of the free running surface (4) of tire tread cap layer (3), which includes the spaces across the openings of any included grooves, including the circumferential grooves (15). Second tread cap zone (12) also spans, for example, about 50 percent of the said span (L) of free running surface (4) of tire tread cap layer (3).

Other embodiments are envisioned wherein the first and second tread cap zones are assymmetrically disposed, i.e., where for example the first tread cap zone spans about 75 percent of the span and the second tread cap zone spans about 25 percent of the span. Generally, the first tread cap zone may span from 20 to 80 percent of the span of the free running surface of the tire tread cap layer, and the second tread cap zone may correspondingly span from 80 to 20 percent of the span. More generally, additional tread cap zones may be envisioned adjacent to the first and/or second tread cap zones, so the first and second tread cap zones represent the minimum, at least two tread cap zones present in the tread cap.

Span (L) represents the axial width of the span of the free running surface of the tread and span (L') represents the axial width of the span of the total running surface of the tread which includes the additional running surface of the tread cap under tire cornering conditions. Axial span (L) of the free running surface of the tread and axial span (L') of the total running surface of the tread is for the inflated tire operating under 75 percent of its standard load according to the *Tire and Rim Association, Inc. Year Book*, using an inflation pressure of 35 psi (240 kPa) for a passenger tire (e.g., P-metric passenger tire size 225/55R16 standard load would be 670 kg of which 75 percent thereof would be 503 kg). An inflation pressure of 50 psi, or 343 kPa, would have been used for a light truck tire (LT) operating under 75 percent of its standard load according to said "Year Book". Under cornering conditions (where the tire is a front, steering tire and the associated vehicle on which the tire is mounted, it intended that at least a portion of the running surfaces of one of shoulder tread cap zones (21) comes in contact, albeit intermittently, with the ground to thereby present at least a portion of an axially extended running surface (L') to the road and thereby provides increased grip for the tire tread). The axial span of the total running surface (L') is illustrated as being a total of about 10 percent greater than the span of the free running surface (L).

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials, and such terms are well known to those having skill in the rubber mixing or rubber compounding art.

A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute.

In this manner, it is considered herein that a relatively low Tg elastomer may be relatively incompatible with the high Tg elastomer as evidenced by their individual Tan delta peaks on a graphical presentation, or plot, of Tan delta versus temperature cured of the rubber composition within a temperature range of about −120° C. to about 10° C. Accordingly, the elastomers of the rubber composition may be present in at least two phases.

For example, a graphical plot of Tan delta versus temperature curve within a broad range of −120° C. to 10° C. for the rubber composition of this invention may yield two peaks in the curve with one peak having its apex within a relatively low temperature range of, for example, −110° C. to −70° C. and a second peak with its apex within a higher temperature range of, for example, −35° C. to +10° C.

Thus, one indication of elastomer incompatibilities is the presence of the dual Tan delta peaks for a sulfur cured elastomer composition. The Tan delta values, with the included peaks in their curves, can be determined by dynamic mechanical testing of the cured compound by procedures well known to those skilled in such art.

Thus, a cured compounded rubber composition may exhibit at least two Tan delta peaks within the aforesaid temperature range. For a cured compounded rubber, it is considered herein that a combination of the Tan delta peak, at the lower temperature (e.g., −100° C. to −50° C.) for the low Tg elastomer (e.g., cis 1,4-polybutadiene), may suggest a promotion of improved resistance to abrasion property (i.e., improved treadwear for a tire) together with the second Tan delta peak, at the higher temperature (e.g., −30° C. to 10° C.) represented by the high Tg elastomer (e.g., the SBR), may suggest a promotion of higher hysteresis at temperatures within a range of about −30° C. to about 0° C. (i.e., higher tire tread traction), all of which is predictive of a better balance of such abrasion resistance and traction properties, particularly for a tire tread, than a cured rubber composition exhibiting only a single Tan delta peak within the aforesaid temperature range of −90° C. to 10° C.

The rubber compositions of the first and second tread cap zones includes elastomer consisting of 30 to 70 parts by weight, per 100 parts by weight of elastomer (phr) of a first styrene-butadiene rubber, 30 to 70 phr of a second styrene-butadiene rubber, and optionally 5 to 20 phr of cis-1,4 polybutadiene. The rubber compositions of the first and second tread zones independently comprises the elastomers, that is, the amounts of the elastomers in the first tread cap zones may be the same or different as the amounts in the second tread cap zones.

The first and second styrene-butadiene rubbers are fully differentiated by their glass transition temperatures. The first and second styrene-butadiene rubbers have a difference in Tg ranging from 10 to 20° C.

At least one of the first and second styrene-butadiene rubbers has a weight average molecular weight (Mw) greater than 1,000,000. Weight average molecular weight may be determined by any of the methods as known in the art, for example by gel permeation chromatography (GPC).

One component of the rubber compositions is from 30 to 70 phr of a first styrene-butadiene rubber, wherein the first styrene-butadiene rubber is i) a solution-polymerized styrene-butadiene rubber with a bound styrene content of from 30 to 50 percent by weight, a vinyl 1,2 content of from 10 to 40 percent by weight based on the rubber weight, and a Tg of from about −40° C. to about −20° C.

As the first styrene-butadiene rubber, suitable solution polymerized styrene-butadiene rubbers may be made, for example, by organo lithium catalyzation in the presence of an organic hydrocarbon solvent. The polymerizations employed in making the rubbery polymers are typically initiated by adding an organolithium initiator to an organic polymerization medium that contains the monomers. Such polymerizations are typically carried out utilizing continuous polymerization techniques. In such continuous polymerizations, monomers and initiator are continuously added to the organic polymerization medium with the rubbery polymer synthesized being continuously withdrawn. Such continuous polymerizations are typically conducted in a multiple reactor system. Suitable polymerization methods are known in the art, for example as disclosed in U.S. Pat. Nos. 4,843,120; 5,137, 998; 5,047,483; 5,272,220; 5,239,009; 5,061,765; 5,405,927; 5,654,384; 5,620,939; 5,627,237; 5,677,402; 6,103,842; and 6,559,240.

As the first styrene-butadiene rubber, suitable solution polymerized styrene-butadiene rubbers are available commercially, such as Dow SE-SLR® 6430 and the like. Such solution polymerized styrene-butadiene rubber may be tin- or silicon-coupled, as is known in the art. In one embodiment, suitable SSBR may be at least partially silicon-coupled.

A second component of the rubber compositions is from 30 to 70 phr of a second styrene-butadiene rubber, wherein the second styrene-butadiene rubber is solution-polymerized styrene-butadiene rubber (SSBR) with a bound styrene content of from 25 to 45 percent by weight, a vinyl 1,2 content of from 20 to 60 percent by weight based on the rubber weight, and a Tg of from about −30° C. to about −5° C. As the second styrene-butadiene rubber, suitable solution polymerized styrene-butadiene rubbers may be made, for example, by organo lithium catalyzation in the presence of an organic hydrocarbon solvent. The polymerizations employed in making the rubbery polymers are typically initiated by adding an organolithium initiator to an organic polymerization medium that contains the monomers. Such polymerizations are typically carried out utilizing continuous polymerization techniques. In such continuous polymerizations, monomers and initiator are continuously added to the organic polymerization medium with the rubbery polymer synthesized being continuously withdrawn. Such continuous polymerizations are typically conducted in a multiple reactor system. Suitable polymerization methods are known in the art, for example as disclosed in U.S. Pat. Nos. 4,843,120; 5,137,998; 5,047,483; 5,272,220; 5,239,009; 5,061,765; 5,405,927; 5,654,384; 5,620,939; 5,627,237; 5,677,402; 6,103,842; and 6,559,240.

As the second styrene-butadiene rubber, suitable solution polymerized styrene-butadiene rubbers are available commercially, such as Tufdene E680 SSBR from Asahi Chemical, and the like. Such solution polymerized styrene-butadiene rubber may be tin- or silicon-coupled, as is known in the art. In one embodiment, suitable SSBR may be at least partially silicon-coupled.

An optional component of the rubber compositions is from about 5 to about 20 phr of cis-1,4 polybutadiene, also known as polybutadiene rubber or polybutadiene (BR). Suitable polybutadiene rubbers may be prepared, for example, by organic solution polymerization of 1,3-butadiene. The BR may be conveniently characterized, for example, by having at least a 90 percent cis 1,4-content and a glass transition temperature Tg in a range of from −95 to −105° C. Suitable polybutadiene rubbers are available commercially, such as Budene® 1207 from Goodyear and the like.

The rubber compositions include processing oil and resin in a combined amount of from 55 to 75 phr.

The rubber compositions include from 40 to 60 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. In one embodiment, the rubber composition includes a low PCA oil. Suitable low PCA oils include but are not limited to mild extraction solvates (MES), treated distillate aromatic extracts (TDAE), residual aromatic extract (RAE), SRAE, and heavy napthenic oils as are known in the art; see for example U.S. Pat. Nos. 5,504,135; 6,103, 808; 6,399,697; 6,410,816; 6,248,929; 6,146,520; U.S. Published Applications 2001/00023307; 2002/0000280; 2002/0045697; 2001/0007049; EP0839891; JP2002097369; ES2122917.

Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber compositions include from 15 to 35 phr of a resin.

Suitable resins include a styrene-butadiene copolymer having a number average molecular weight (Mn) ranging from 1,000 to 15,000; a styrene content of from 17 to 27 percent by weight, and a vinyl content of 60 to 80 percent by weight. Suitable styrene-butadiene copolymer is available commercially as Ricon 100 from Sartomer.

Suitable resins also include an alpha methylstyrene resin derived from styrene and alphamethylstyrene. It is considered that, in one aspect, its glass transition temperature (Tg) characteristic combined with its molecular weight (Mn) and molecular weight distribution (Mw/Mn) provides a suitable compatibility of the resin in the rubber composition, the degree of compatibility being directly related to the nature of the rubber composition.

The presence of the styrene/alphamethylstyrene resin with a rubber blend which contains the presence of the styrene-butadiene elastomer is considered herein to be beneficial because of observed viscoelastic properties of the tread rubber composition such as complex and storage modulus, loss modulus tan.delta and loss compliance at different temperature/frequency/strain as hereinafter generally described.

The properties of complex and storage modulus, loss modulus, tan.delta and loss compliance are understood to be generally well known to those having skill in such art. They are hereinafter generally described.

The molecular weight distribution of the resin is visualized as a ratio of the resin's weight average molecular weight (Mw) to number average molecular weight (Mn) values and is considered herein to be in a range of about 1.5/1 to about 2.5/1 which is considered to be a relatively narrow range. This believed to be advantageous because of the selective compatibility with the polymer matrix and because of a contemplated use of the tire in wet and dry conditions over a wide temperature range.

The glass transition temperature Tg of the copolymer resin is considered herein to be in a range of about 20° C. to about 100° C., alternatively about 30° C. to about 80° C., depending somewhat upon an intended use of the prepared tire and the nature of the polymer blend for the tire tread.

The styrene/alphamethylstyrene resin is considered herein to be a relatively short chain copolymer of styrene and alphamethylstyrene with a styrene/alphamethylstyrene molar ratio in a range of about 0.40 to about 1.50. In one aspect, such a resin can be suitably prepared, for example, by cationic copolymerization of styrene and alphamethylstyrene in a hydrocarbon solvent.

Thus, the contemplated styrene/alphamethylstyrene resin can be characterized, for example, by its chemical structure, namely, its styrene and alphamethylstyrene contents and softening point and also, if desired, by its glass transition temperature, molecular weight and molecular weight distribution.

In one embodiment, the styrene/alphamethylstyrene resin is composed of about 40 to about 70 percent units derived from styrene and, correspondingly, about 60 to about 30 percent units derived from alphamethylstyrene. In one embodiment, the styrene/alphamethylstyrene resin has a softening point according to ASTM No. E-28 in a range of about 80° C. to about 145° C.

Suitable styrene/alphamethylstyrene resin is available commercially as Resin 2336 from Eastman with a Tg of 38° C.

Suitable resins also include a dimerized gum rosin. The dimerized gum rosin may include predominately dimers of rosin acids with some monomeric rosin acids. Suitable dimerized gum rosin is available commercially as Dymerex from Eastman, reportedly having a number average molecular weight Mn of 412 and a weight average molecular weight MW of 487.

The rubber compositions also include carbon black and silica in combined amount of from 115 to 135 phr. In the first tread cap zone, the weight ratio of silica to carbon black ranges from 4:1 to 6:1. In the second tread cap zone, the weight ratio of silica to carbon black ranges from 0.7:1 to 1.3:1.

The employed silica which may be used in the rubber compound include pyrogenic and precipitated silica. In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Suitable carbon blacks include N110, N121, N134, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. Suitable carbon blacks have iodine absorptions ranging from 9 to 220 g/kg and DBP oil absorption number ranging from 34 to 150 cm³/100 g. In one embodiment, the carbon black has an iodine absorption ranging from 130 to 210 g/kg according to ASTM-D1510 and a DBP oil absorption number ranging from 110 to 140 cc/100 g according to ASTM D-2414.

The vulcanizable rubber composition may optionally include from 1 to 20 phr of crosslinked particulate polymer gel, ultra high molecular weight polyethylene (UHMWPE) or plasticized starch.

Other fillers may be used in the rubber composition including, but not limited to, particulate fillers including ultra high molecular weight polyethylene (UHMWPE), particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639.

In one embodiment the rubber composition for use in the tire tread may contain a conventional sulfur containing organosilicon compound. Examples of suitable sulfur containing organosilicon compounds are of the formula:

$$Z\text{-Alk-}S_n\text{-Alk-}Z \qquad\qquad I$$

in which Z is selected from the group consisting of

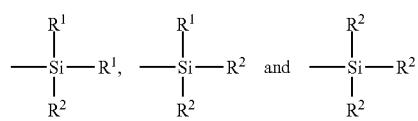

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl) octasulfide, 3,3'-bis(trimethoxysilylpropyl)tetrasulfide, 2,2'-bis(triethoxysilylethyl)tetrasulfide, 3,3'-bis(trimethoxysilylpropyl) trisulfide, 3,3'-bis(triethoxysilylpropyl)trisulfide, 3,3'-bis(tributoxysilylpropyl)disulfide, 3,3'-bis(trimethoxysilylpropyl) hexasulfide, 3,3'-bis (trimethoxysilylpropyl) octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl) tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyldodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

In one embodiment, the sulfur containing organosilicon compounds are the 3,3'-bis(trimethoxy or triethoxy silylpropyl) sulfides. In one embodiment, the sulfur containing organosilicon compounds are 3,3'-bis(triethoxysilylpropyl)disulfide and 3,3'-bis(triethoxysilylpropyl)tetrasulfide. Therefore, as to formula I, Z may be

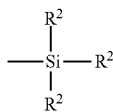

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. As disclosed in U.S. Pat. No. 6,608,125, these sulfur containing organosilicon compounds are of the formula G-C(=O)—S—CH$_2$CH$_2$CH$_2$SiX$_3$ wherein each X is an independently selected RO— group wherein each R is independently selected from the group consisting of hydrogen, alkyl that may or may not contain unsaturation, alkenyl groups, aryl groups, and aralkyl groups, such moieties other than hydrogen having from 1 to 18 carbon atoms, and G is a monovalent alkyl of from 6 to 8 carbon atoms. In one embodiment, the sulfur containing organosilicon compounds includes 3-(octanoylthio)-1-propyltriethoxysilane, CH$_3$(CH$_2$)$_6$C(=O)—S—CH$_2$CH$_2$CH$_2$Si(OCH$_2$CH$_3$)$_3$, which is available commercially as NXT™ from GE Silicones.

In another embodiment, suitable sulfur containing organosilicon compounds include those disclosed in U.S. Patent Publication 2003/0130535. As disclosed in U.S. Patent Publication 2003/0130535, these sulfur containing organosilicon compounds are of the formulas II or III

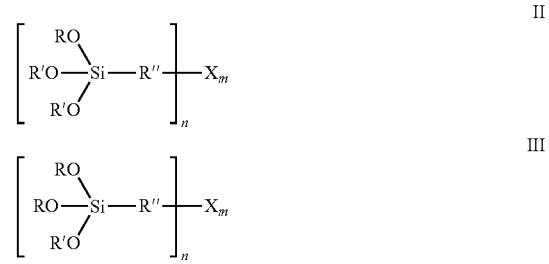

wherein: R is a methyl or ethyl group;
R' is identical or different and is a C$_9$C$_{30}$ branched or unbranched monovalent alkyl or alkenyl group, aryl group, aralkyl group, branched or unbranched C$_2$-C$_{30}$ alkyl ether group, branched or unbranched C$_2$-C$_{30}$ alkyl polyether group or R'''$_3$Si, where R''' is C$_1$-C$_{30}$ branched or unbranched alkyl or alkenyl group, aralkyl group or aryl group, R'' is a branched or unbranched, saturated or unsaturated, aliphatic, aromatic or mixed aliphatic/aromatic divalent C$_1$-C$_{30}$ hydrocarbon group;
X is SH where n=1 and m=1, S where n=2 and m=1-10 and mixtures thereof, S(C=O)—R''' where n=1 and m=1 or H where n=1 and m=1;
R'' may mean CH$_2$, CH$_2$CH$_2$, CH$_2$CH$_2$CH$_2$, CH$_2$CH$_2$CH$_2$CH$_2$, CH(CH$_3$), CH$_2$CH(CH$_3$), C(CH$_3$)$_2$, CH(C$_2$H$_5$), CH$_2$CH$_2$CH(CH$_3$), CH$_2$CH(CH$_3$)CH$_2$ or

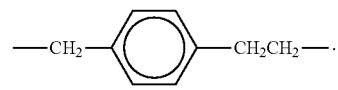

In one embodiment, the sulfur containing organosilicon compound is of formula II, R is ethyl, R' is C$_{12}$-C$_{14}$ alkyl, R'' is CH$_2$CH$_2$CH$_2$, X is SH, n is 1 and m is 1. In one embodiment, the sulfur containing organosilicon compound is Si-363 from Degussa.

In one embodiment, the sulfur containing organosilicon compound is a combination of 3,3'-bis(triethoxypropylsilyl) tetrasulfide and 3-(octanoylthio)-1-propyltriethoxysilane The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfurvulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 3 phr. Fatty acid glycerides may be used in an amount from about 0.5 to about 3 phr. Fatty acid salts, including zinc salts, may be used in an amount from about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the compound is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. All parts are parts by weight unless specifically identified otherwise.

EXAMPLE 1

In this example, two rubber compounds are compared. Sample 1 represents a control sample. Sample 2 and 3 are representative of the present invention.

The elastomers were compounded in a multi-stage mix procedure with standard amounts of conventional curatives and processing aids as indicated in Table 1 (all amounts in phr), and cured with a standard cure cycle. Cured samples were evaluated for various physical properties following standard tests protocols as indicated in Table 2. Tires having tread made from compounds of samples 1 and 2 were tested for various performance criteria as shown in Table 3 (values normalized to the control=100)

TABLE 1

Compound Recipes

| Sample | 1 control | 2 | 3 |
|---|---|---|---|
| Polybutadiene [1] | 10 | 10 | 10 |
| Solution SBR [2] | 0 | 50 | 50 |
| Solution SBR [3] | 0 | 40 | 40 |
| Solution SBR [4] | 75 | 0 | 0 |
| 3,4-Polyisoprene | 15 | 0 | 0 |
| Silica [5] | 95 | 105 | 56 |
| Carbon black [6] | 20 | 20 | 62 |
| Oil [7] | 31 | 49 | 44 |
| Resin [8] | 8 | 15 | 10 |
| Resin [9] | 0 | 5 | 5 |
| Resin [10] | 8 | 0 | 0 |
| Low MW Styrene-Butadiene [11] | 0 | 0 | 11.76 |
| Coupling agent [12] | 6 | 7.6 | 4 |
| Waxes [13] | 1.5 | 1.5 | 1.5 |
| Fatty acids [14] | 3.5 | 5 | 5 |
| Antidegradant [15] | 0.5 | 4.5 | 4.5 |
| Zinc oxide | 2.5 | 2.5 | 2.5 |
| Sulfur | 1.8 | 1.9 | 1.9 |
| Accelerators [16] | 4.7 | 4.9 | 4.3 |

[1] Budene1207 from Goodyear Tire & Rubber Chemical
[2] SE SLR6430 solution polymerized styrene-butadiene rubber, 40% styrene, 14% vinyl, Tg (OE) = −34° C., 37.5 phr TDAE oil, from Styron.

TABLE 1-continued

Compound Recipes

| Sample | 1 control | 2 | 3 |
|---|---|---|---|

[3] Tufdene E680 solution polymerized styrene-butadiene rubber, 34% styrene, 38% vinyl, Tg(OE) = −25° C., 37.5 phr SRAE oil, from Asahi Chemical
[4] SE SLR 4630, partially silicon-coupled, solution-polymerized styrene butadiene rubber extended with 37.5 phr TDAE oil, typical properties reported as 25 percent by weight of styrene and 63 percent by weight vinyl (of butadiene segments), Tg = −28.9° C., Mooney ML 1 + 4 (100° C.) = 55, from the Dow Chemical Company
[5] Precipitated Silica, BET Nitrogen Surface Area =160 m2/g
[6] Furnace black with iodine absorption number = 202 g/kg (ASTM D-1510), oil absorption number = 134 cc/kg (ASTM D-2414)
[7] RAE, SRAE & TDAE oil
[8] Alphamethyl styrene resin, as Resin 2336 from Eastman
[9] Dimerized gum rosin, as Dymerex from Eastman
[10] coumarone-indene resin
[11] Ricon 100, low molecular weight styrene-butadiene copolymer, 25% styrene, 70% vinyl, MW = 4500, from Cray Valley
[12] 50% Bis(triethoxysilylpropyl) tetrasulfide on carbon black
[13] Microcrystalline & paraffinic waxes
[14] fatty acids, fatty acid zinc salts, and fatty acid glycerides
[15] p-phenylenediamine and quinoline types
[16] Sulfenamide and guanidine type

TABLE 2

| Sample | 1 | 2 | 3 |
|---|---|---|---|
| Shore A | 70 | 67.1 | 67 |
| Rebound 23° C. | 17 | 14.3 | 13.1 |
| Rebound 100° C. | 46 | 40.6 | 34.4 |
| Elongation, % | 582 | 649 | 671 |
| G' @ 1% strain, MPa | 5.8 | 5.45 | 4.5 |
| Tanδ @ 10% strain | 0.202 | 0.254 | 0.307 |
| G' @ 50%, MPa | 1.089 | 0.254 | 0.307 |
| Modulus @ 300% | 8 | 6.1 | 5.5 |
| Tensile strength, MPa | 15.1 | 13.7 | 13.9 |

TABLE 3

| Sample | 1 | 2 | 3 |
|---|---|---|---|
| Wet Braking | 100 | 109 | 99 |
| Wet Handling | 100 | 105 | 102 |
| Dry Handling | 100 | 102 | 97 |
| Dry Braking | 100 | 110 | 110 |

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire having a rubber tread of a cap/base construction comprising an outer rubber tread cap layer containing an outer running surface and an underlying rubber tread base layer; wherein said tread cap layer comprises at least two circumferential, longitudinal rubber tread cap zones; wherein said tread cap zones individually extend from said tread cap running surface radially inward to said tread base layer; wherein said at least two tread cap zones comprises a first tread cap zone and a second tread cap zone adjacent to the first tread cap zone; the first tread cap zone and the second tread cap zone each independently comprising a vulcanizable rubber composition comprising:

30 to 70 parts by weight, per 100 parts by weight of elastomer (phr) of a first styrene-butadiene rubber; wherein the first styrene-butadiene rubber is i) a solution-polymerized styrene-butadiene rubber with a bound styrene content of from 30 to 50 percent by weight, a vinyl 1,2 content of from 10 to 40 percent by weight based on the rubber weight, and a Tg of from about −40° C. to about −20° C.;

30 to 70 phr of a second styrene-butadiene rubber wherein the second styrene-butadiene rubber is a solution-polymerized styrene-butadiene rubber with a bound styrene content of from 25 to 45 percent by weight, a vinyl 1,2 content of from 20 to 60 percent by weight based on the rubber weight, and a Tg of from about −30° C. to about −5° C.;

40 to 60 phr of a low PCA process oil having a polycyclic aromatic content of less than 3 percent by weight as determined by the IP346 method, and 15 to 35 phr of a resin, wherein the total amount of oil and resin ranges from 55 to 75 phr; and carbon black and silica in a combined amount of from 115 to 135 phr;

wherein at least one of the first and second styrene-butadiene rubbers has a weight average molecular weight greater than 1,000,000;

wherein the first styrene-butadiene rubber and the second styrene-butadiene rubber have a difference in Tg ranging from 10 to 20° C.;

wherein the weight ratio of silica to carbon black in the rubber composition of the first tread cap zone is in a range of from 4:1 to 6:1 and the weight ratio of silica to carbon black in the rubber composition of the second tread cap zone is in a range of from 0.7:1 greater than 1:1 to less than or equal to 1.3:1.

2. The pneumatic tire of claim 1, wherein the resin is selected from a group consisting of i) a styrene-butadiene copolymer having a number average molecular weight (Mn) ranging from 1,000 to 15,000; a styrene content of from 17 to 27 percent by weight, and a vinyl content of 60 to 80 percent by weight, ii) a dimerized gum rosin; and (iii) a styrene/alphamethyl styrene resin.

3. The pneumatic tire of claim 1, wherein the rubber composition further comprises from 5 to 20 phr of cis-1,4 polybutadiene having a Tg of from −110° C. to −90° C.

* * * * *